(12) United States Patent
Mayer

(10) Patent No.: US 9,295,193 B2
(45) Date of Patent: Mar. 29, 2016

(54) WATER RAKE FOR SKIMMING PONDS

(71) Applicant: John Frederick Mayer, Plainfield, IL (US)

(72) Inventor: John Frederick Mayer, Plainfield, IL (US)

( * ) Notice: Subject to any disclaimer, the term of this patent is extended or adjusted under 35 U.S.C. 154(b) by 0 days.

(21) Appl. No.: 14/464,225

(22) Filed: Aug. 20, 2014

(65) Prior Publication Data

US 2015/0052870 A1 Feb. 26, 2015

Related U.S. Application Data

(60) Provisional application No. 61/869,471, filed on Aug. 23, 2013.

(51) Int. Cl.
*A01D 44/00* (2006.01)
*A01D 7/02* (2006.01)
*A01K 80/00* (2006.01)
*A01D 7/06* (2006.01)

(52) U.S. Cl.
CPC .. *A01D 7/02* (2013.01); *A01D 7/06* (2013.01); *A01D 44/00* (2013.01); *A01K 80/00* (2013.01)

(58) Field of Classification Search
CPC combination set(s) only.
See application file for complete search history.

(56) References Cited

U.S. PATENT DOCUMENTS

| | | | |
|---|---|---|---|
| 97,420 A * | 11/1869 | Mayhew | 37/316 |
| 121,227 A * | 11/1871 | Baker | 37/316 |
| 434,099 A | 8/1890 | Swett et al. | |
| 734,571 A * | 7/1903 | Knapp | 37/316 |
| 1,014,250 A * | 1/1912 | Norman | 56/400.11 |
| 3,394,483 A * | 7/1968 | Taglioli | 43/11 |
| 3,688,483 A | 9/1972 | Hamilton | |
| 3,811,325 A | 5/1974 | Carter | |
| 3,863,237 A | 1/1975 | Doerr | |
| 4,275,545 A | 6/1981 | Pace | |
| 4,828,690 A | 5/1989 | Montez | |
| 4,852,337 A * | 8/1989 | Peterson | 56/8 |
| 5,079,905 A | 1/1992 | Bergstrom | |
| 5,305,585 A | 4/1994 | Cousineau | |
| 5,450,713 A | 9/1995 | Rohde | |
| 5,705,058 A | 1/1998 | Fisher | |
| 6,672,039 B1 | 1/2004 | Shonnard | |
| 6,726,265 B2 | 4/2004 | Miller | |
| 6,920,744 B2 | 7/2005 | Shonnard | |
| 7,111,741 B2 | 9/2006 | Bramante | |
| 7,603,836 B2 | 10/2009 | Grosjean | |
| 7,771,593 B2 | 8/2010 | Coffman | |
| 8,056,308 B2 | 11/2011 | Shonnard | |
| 8,220,232 B1 | 7/2012 | Marvin | |
| 8,381,500 B2 | 2/2013 | Grimes | |
| 2008/0223011 A1 | 9/2008 | Shonnard | |
| 2009/0193776 A1 | 8/2009 | Grosjean | |
| 2010/0263347 A1 | 10/2010 | Baker | |
| 2011/0146113 A1 | 6/2011 | Gidney | |
| 2012/0124957 A1 | 5/2012 | Meyers | |

* cited by examiner

*Primary Examiner* — Alicia Torres
(74) *Attorney, Agent, or Firm* — Erickson Law Group, PC

(57) ABSTRACT

A water rake for skimming vegetation and debris off ponds includes a handle and a frame. The frame is attached to the handle and the handle extends rearward from the frame. The frame has an open area closed by a net or web to capture the vegetation or debris as the rake is pulled through the water. A plurality of spaced-apart prongs are connected at base ends to the frame and extend from the frame generally in a rearward direction to retain collected vegetation and debris in the net or web, or otherwise collected in the frame.

10 Claims, 4 Drawing Sheets

WATER RAKE FOR SKIMMING PONDS

This application claims the benefit of U.S. Provisional Application 61/869,471, filed Aug. 23, 2013.

BACKGROUND

On the surface of bodies of water, or below the surface, debris can accumulate, such as refuse, algae and floating aquatic vegetation.

U.S. Pat. Nos. 3,811,325; 3,863,237; 5,450,713; 5,705,058; 7,111,741 and 7,603,836 disclose various skimming or raking screens that are pulled through the water by handles or ropes, some floating and others non-floating.

U.S. patent application Nos. 2012/0124957 and 2010/0263347 U.S. Pat. No. 7,771,593 disclose floating pond raking or skimming devices.

It would be desirable to provide a pond rake that is light weight and able to be handled and deployed by a user, while also being effective in collecting floating vegetation, algae and other debris.

SUMMARY

A water rake is provided that is lightweight and effectively handled and deployed by a user. The rake provides an apparatus that not only effectively screens water surfaces, and below, but provides a mechanism to retain debris or collected material in the rake for removal and disposal. When held in a vertical orientation debris or collected material can be released by gravity. The rake is adjustable in buoyancy to collect materials at or below the water surface.

A water rake is provided that includes a handle and a frame attached to the handle. The handle extends rearward from the frame. The frame has an open area closed by a net. A plurality of prongs extends from the frame generally in a rearward direction. The prongs help retain debris and other collected material in the net or otherwise collected by the frame.

The frame is preferably rectangular. The open area of the frame defines a plane and the prongs are arranged at an oblique angle relative to the plane.

Prongs along a top area of the frame are declined from the frame and prongs along a bottom area of the frame are inclined from the frame.

The handle and frame comprise tubular members.

The frame can be entirely sealed from ingress or egress of water.

A valve is provided on the rake to selectively accept water into the frame and retain the water in the frame, i.e., in the tubular members of the frame.

An angled brace is connected between the handle and the frame, wherein the brace is also tubular and in flow communication with the frame and mounts the valve.

Alternately, only selected portions of the rake can receive and retain water, such as the frame, or the brace and the frame. The handle, for example can be sealed from the inside of the frame and could be sealed from ingress or egress of water within the handle, or not.

Numerous other advantages and features of the present invention will become readily apparent from the following detailed description of the invention and the embodiments thereof, from the claims and from the accompanying drawings.

DETAILED DESCRIPTION

Figure 1:
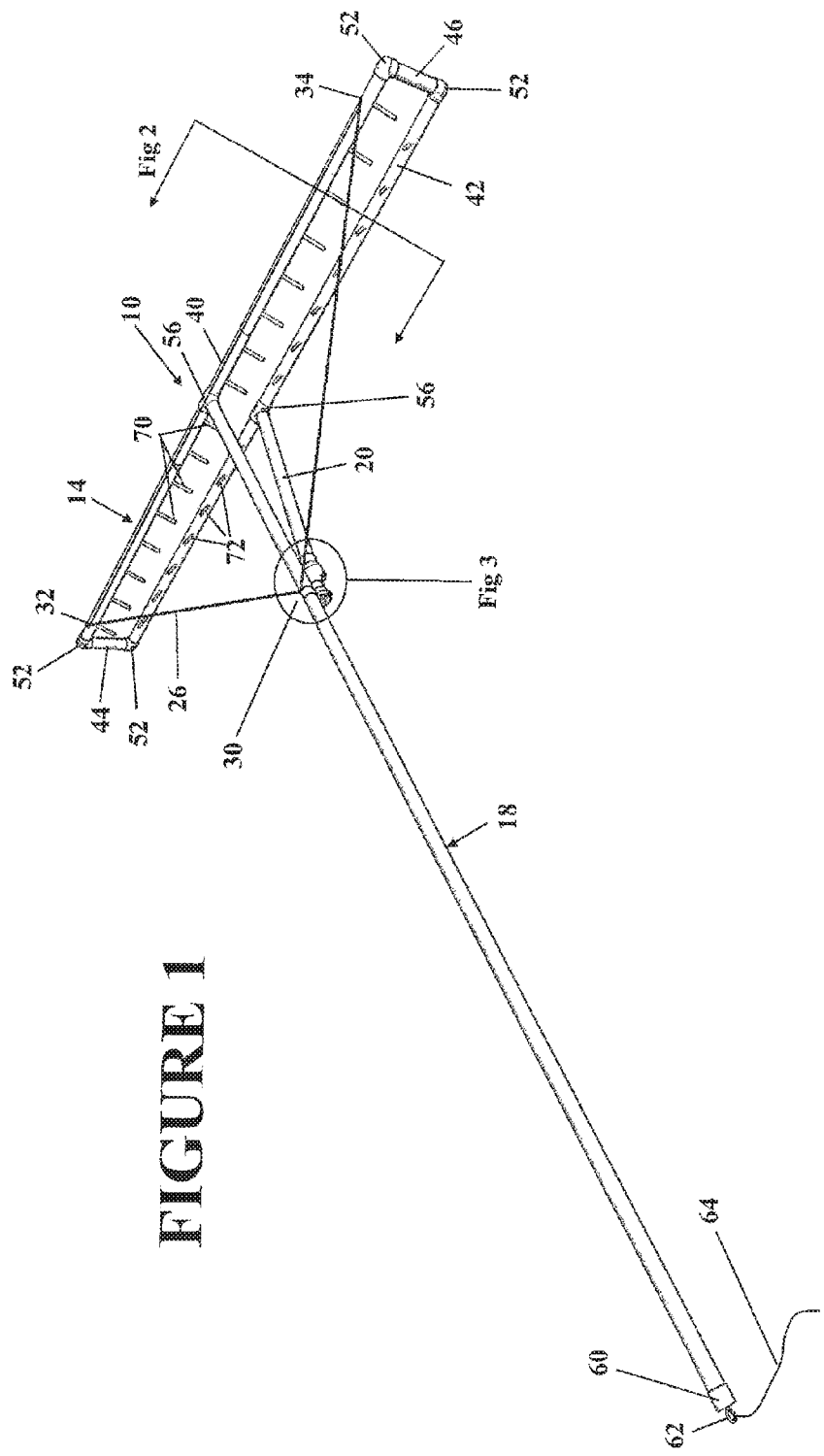
FIG. 1 is a perspective view of a rake according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a rake 10 having in a rectangular collecting frame 14 connected to an elongated handle 18. The handle extends rearward from the frame toward a user. An angular brace 20 is connected between the frame 14 and handle 18.

A tension wire 26 forms a triangle between three fixed fastening locations 30, 32, 34 located on the handle 18 and frame 14 respectively. The tension wire 26 structurally stabilizes the frame with respect to the handle, and prevents bending or breaking of the frame 14 subject to vegetation resistance as the frame 14 is pulled through and out of the water by the handle. The locations can be fasteners that are fastened into the frame and handle, wherein the wire is tightly wound a few turns around the fastener.

The frame 14 includes a top member 40, and a parallel bottom member 42 connected together by opposite side members 44, 46. The members 40, 42, 44, 46 are preferably hollow tubes and can be connected together by 90° hollow tube joints 52.

The handle 18 can be attached to the member 40 using a clamp or a tee joint such as a tubular tee member 56. In the case of using a tee member, the member 40 is cut and fit into the tee member such that the handle, tee member and upper member 40 are open to each other on the inside.

The brace 20 can be attached to the frame member 42 using a clamp joint or a tubular tee member 56. In the case of using a tee member, the lower frame member 42 is cut and fit into the tee member such that the brace 20, the tee member 56 and the lower frame member 42 are open to each other on the inside.

The handle 18 is preferably a hollow tube and is closed at a distal end to the frame 14 by a cap 60. A faster such as an eye-bolt 62 is fixed to an end of the cap 60 and is used for attaching a rope 64 to the handle 18. The rope 64 is sufficiently long for the user to cast the rake out into the pond at a distance from the user. The user can then draw back the rake toward the user handle side first, by reeling in the rope, to rake through the pond.

Figure 2:
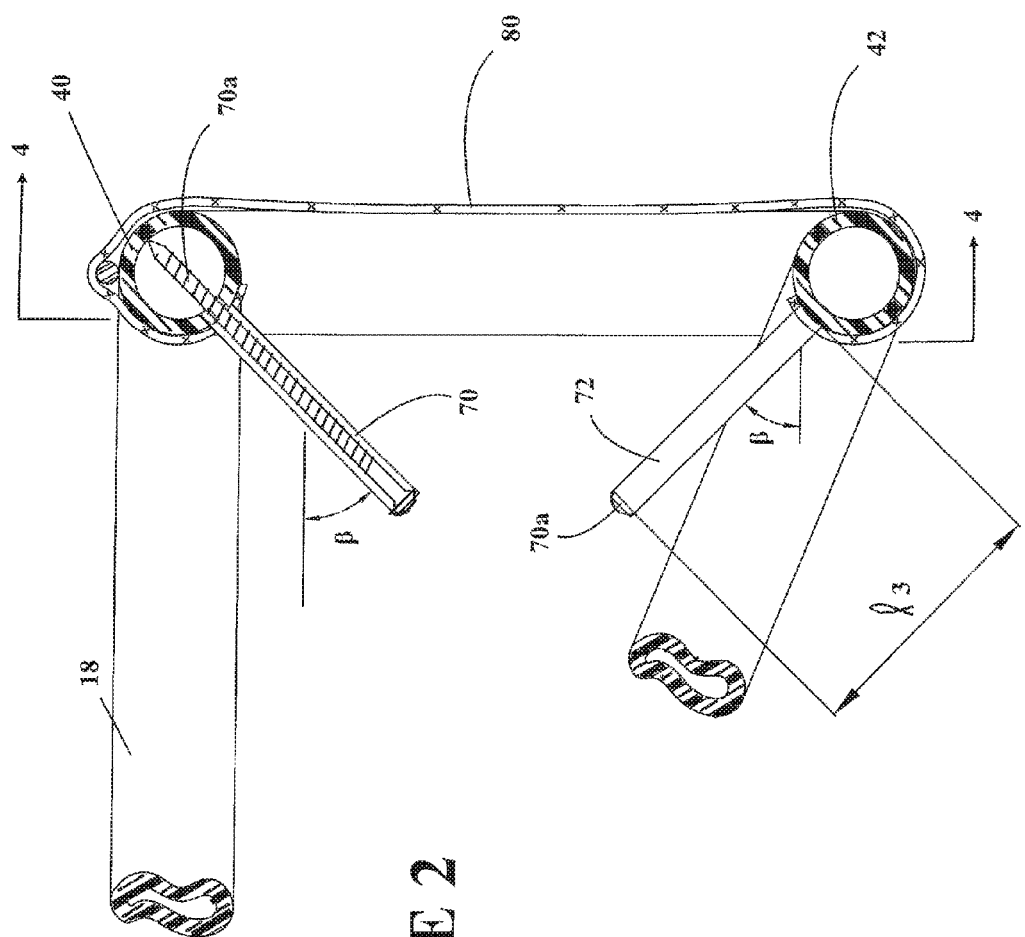
FIG. 2 is a sectional view taken generally along line 2-2 of FIG. 1.

FIGS. 1 and 2 show that the upper frame member 40 mounts downwardly angled prongs or rods 70. The prongs are spaced apart along the frame member 40. The rods 70 extend perpendicularly from the frame member, in parallel, in a direction generally toward the distal end of the handle. The lower frame member 42 mounts upwardly angled prongs or rods 72 that are spaced apart along the frame member 42. The rods 72 extend perpendicularly from the frame member 42, in parallel, in a direction generally toward the distal end of the handle. The rods 70, 72 can be tubular. The rod 70 in FIG. 2 is shown in section to show the attachment method for the rods 70, 72. Each of the rods 70, 72 is mounted to the frame by a screw 70a with a head diameter similar to the diameter of the rods 70, 72. The screw 70a freely extends through the rod and is threaded through the wall of the tubular frame member adjacent to the rod and is threaded into but does not penetrate the opposite side of the tubular frame member. Other ways of fastening the rods 70, 72 to the frame are encompassed by the invention.

A net 80 closes a rectangular open side of the frame 14 defined between the members 40, 42, 44, 46, opposite the handle 18. The net has openings sufficiently large to allow water and small objects to past therethrough as the rake is pulled through the water, but small enough to capture the desired vegetation and debris to be removed from the water. The net openings are square with sides parallel to the respective frame sides and can have a width dimension of ¾ to 1". Alternatively, a lacing or webbing can be provided by lacing or criss-crossing rope or the like between the rods 70, 72.

Figure 3:
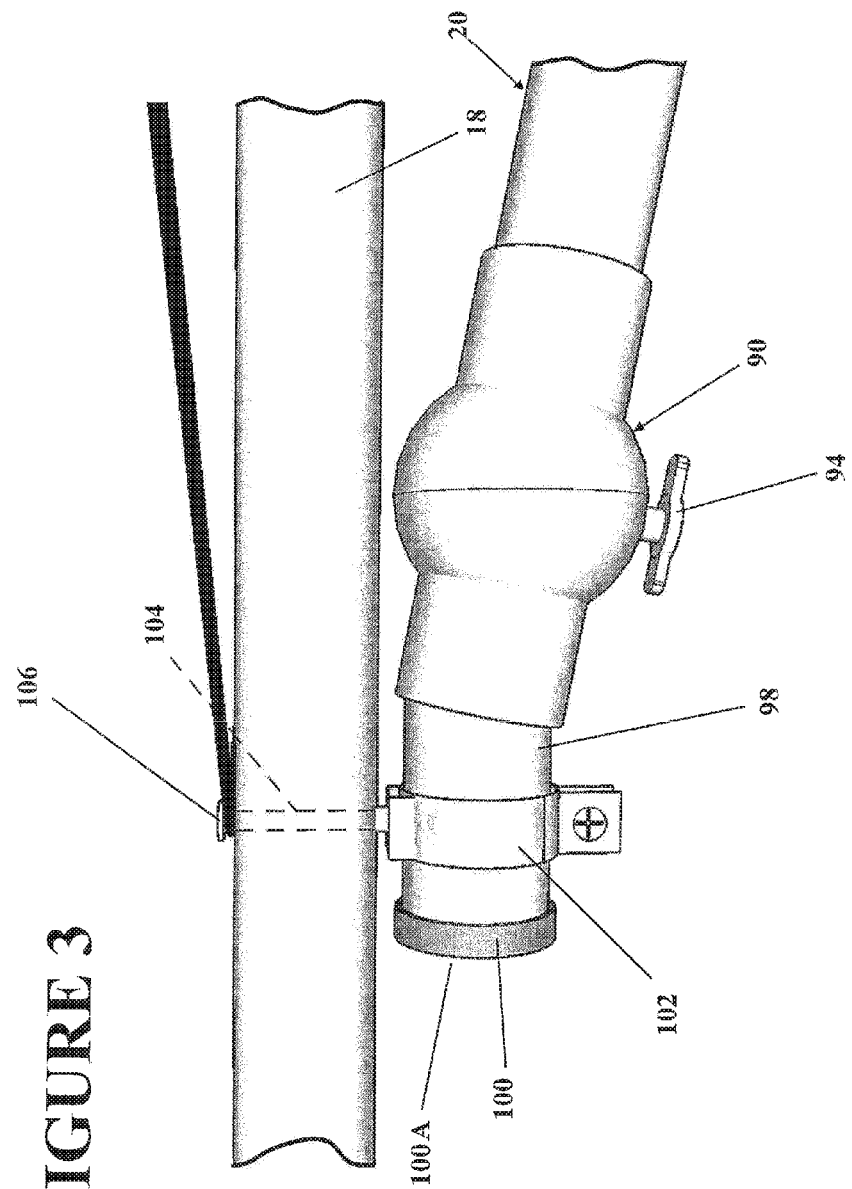
FIG. 3 is an enlarged elevation view taken from FIG. 1.

FIG. 3 illustrates the connection area of the brace 20 in the handle 18. The brace 20 terminates in a valve 90 having an open/close mechanism 94, and an oblique angle fitting such as a 22.5° fitting or a 45° fitting 98 connected to the valve 90. The fitting has an open end 100 covered by a fine screen 100a to prevent debris from entering the open end 100. The fitting 98 is tightly clamped by a pipe clamp 102 or the like. The pipe clamp 102 includes a fastener 104 that penetrates through holes through the handle 18 and is tightened by a nut 106 to fasten the pipe clamp 102 and brace 20 tightly to the handle 18. Preferably, the handle 18, the frame 14 and the brace 20 are all in flow communication via the hollow insides of the tube members. The elbow joints 52 and the tee joints 56 are also in flow communication with the members attached thereto.

The valve 90 allows for the entry of a desired amount of water into the rake 10. By opening the valve while the valve and fitting are submerged, water can pass into the rake through the valve. This can be used to set a desired buoyancy for a desired skimming depth of the frame in the water as a rake 10 is pulled through the water.

Figure 4:
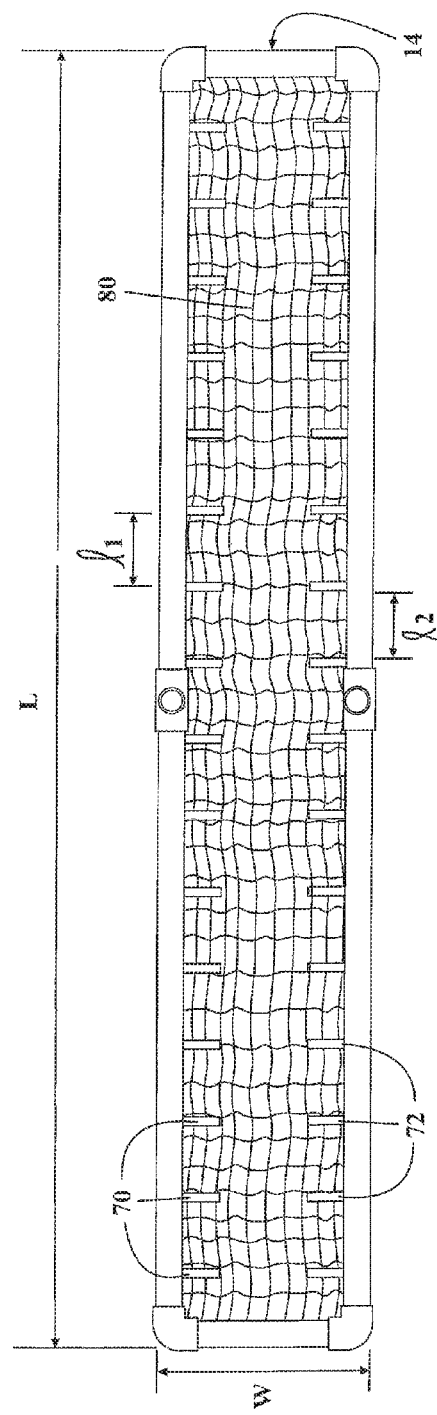
FIG. 4 is a sectional view taken generally along line 4-4 of FIG. 2.

FIGS. 2 and 4 illustrate some advantageous dimensions. The overall length L of the frame 14 can be 52, 46 or 40 inches, but the invention encompasses other sizes as well. The handle can be 5 feet, 6 inches. The overall width W of the frame 14 can be 8 inches. The spacing of the upper prongs 70 along the member 40 can be 3 inches. The spacing of the lower prongs 72 along the member 42 can be 3 inches. The upper prongs are preferably in line with the lower prongs along the length of the frame. The number of upper prongs can be 16. The number of lower prongs can be 16. The prongs preferably have a length L3 of about 2 inches and a diameter of about ¼ inch. With the handle 18 held horizontal and the frame 14 oriented vertically, the angle β of the prongs 70, 72 to horizontal is preferably about 35 degrees.

Advantageously, the members 20, 40, 42, 44, 46, and 52 are tubular plastic pipe elements having a nominal diameter of ¾ inches. Advantageously, the member 18 can be tubular plastic pipe element having a nominal diameter of 1 inch. The upper member 56 can be a tubular plastic pipe element having nominal diameters of 1 inch×¾ inch×¾ inch. The lower member 56 can be a ¾" by ¾" by ¾" tee.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A water rake, comprising:
   a handle;
   a frame attached to the handle, the handle extending rearward from the frame, the frame having an open area closed by a net or web; and
   a plurality of spaced-apart prongs connected at base ends to the frame and extending from the frame generally in a rearward direction;
   wherein the open area defines a plane and the prongs are arranged at an oblique angle relative to the plane; and
   wherein prongs along a top area of the frame are declined from the frame and prongs along a bottom area of the frame are inclined.

2. The rake according to claim 1, wherein the handle and frame comprise tubular members.

3. The rake according to claim 2, wherein the frame is substantially sealed from water.

4. The rake according to claim 3, comprising a valve to selectively accept water into the frame.

5. The rake according to claim 4, comprising an angled brace connected between the handle and the frame, wherein the brace is tubular and mounts the valve.

6. A water rake, comprising:
   a handle;
   a frame attached to the handle, the handle extending rearward from the frame, the frame having an open area closed by a net or web; and
   a plurality of spaced-apart prongs connected at base ends to the frame and extending from the frame generally in a rearward direction;
   wherein the prongs on sides of the frame extend generally toward the respective opposite side of the frame.

7. The rake according to claim 6, wherein the frame is rectangular and the handle is substantially perpendicular to the frame, and comprising angular tension members that extend from the handle to outer portions of the frame.

8. The rake according to claim 7, wherein the handle and frame are comprised of tubular members and the angular tension members are comprised of wires.

9. The rake according to claim 6, wherein the frame is comprised of tubular members that can be filled with a selected amount of water to allow the frame to be partially submerged during raking operation.

10. The rake according to claim 9, wherein the frame is of rectangular configuration having the plurality of prongs extending from upper and lower, parallel members of the frame.

* * * * *